US012677061B2

(12) United States Patent
Chen

(10) Patent No.: US 12,677,061 B2
(45) Date of Patent: Jul. 7, 2026

(54) SYSTEMS AND METHODS FOR AUTOMATED IMAGE CAPTURE ASSISTANCE AND DUAL CAMERA MODE

(71) Applicant: Adeia Imaging LLC, San Jose, CA (US)

(72) Inventor: Tao Chen, Palo Alto, CA (US)

(73) Assignee: Adeia Imaging LLC, San Jose, CA (US)

( * ) Notice: Subject to any disclaimer, the term of this patent is extended or adjusted under 35 U.S.C. 154(b) by 256 days.

(21) Appl. No.: 18/203,112

(22) Filed: May 30, 2023

(65) Prior Publication Data

US 2024/0406545 A1     Dec. 5, 2024

(51) Int. Cl.
| | |
|---|---|
| *H04N 23/60* | (2023.01) |
| *H04N 5/262* | (2006.01) |
| *H04N 5/272* | (2006.01) |
| *H04N 23/611* | (2023.01) |
| *H04N 23/62* | (2023.01) |
| *H04N 23/90* | (2023.01) |

(52) U.S. Cl.
CPC ........... *H04N 23/64* (2023.01); *H04N 5/2628* (2013.01); *H04N 5/272* (2013.01); *H04N 23/611* (2023.01); *H04N 23/62* (2023.01); *H04N 23/90* (2023.01)

(58) Field of Classification Search
CPC ...... H04N 23/64; H04N 23/611; H04N 23/62; H04N 23/90; H04N 23/45; H04N 5/2628; H04N 5/272; H04N 5/265; G06T 7/70; G06T 7/73; G06T 2207/20212; G06T 2207/20221
See application file for complete search history.

(56) References Cited

U.S. PATENT DOCUMENTS

| | | | |
|---|---|---|---|
| 7,855,737 B2 | 12/2010 | Petrescu et al. | |
| 8,243,182 B2 | 8/2012 | Petrescu et al. | |
| 2009/0066811 A1* | 3/2009 | Maekawa | G06T 5/80 |
| | | | 348/E9.002 |
| 2013/0108122 A1* | 5/2013 | Ptucha | G06T 11/00 |
| | | | 382/118 |

(Continued)

OTHER PUBLICATIONS

Anonymous, "How to use, and break, the rule of thirds," https://www.adobe.com/creativecloud/photography/discover/rule-of-thirds.html (downloaded May 11, 23) (12 pages).

(Continued)

*Primary Examiner* — Kelly L Jerabek

(74) *Attorney, Agent, or Firm* — HG LAW LLP

(57) ABSTRACT

Systems and methods are provided for enabling improved image capture at a computing device comprising a plurality of cameras. First and second capture streams, from respective first and second cameras of a computing device, are received at the computing device, wherein the first and second cameras face in different directions. A region of the first capture stream to include as an overlay over a portion of the second capture stream is identified. It is determined that a combined frame comprising a frame from the second capture stream with an overlay from the region of the first capture stream meets threshold criterion based on image component analysis, and, in response to the determining, an image based on the combined frame is stored in a non-transitory memory.

22 Claims, 7 Drawing Sheets

(56) References Cited

U.S. PATENT DOCUMENTS

| | | | | |
|---|---|---|---|---|
| 2013/0235224 | A1* | 9/2013 | Park | H04N 23/64 |
| | | | | 348/E5.024 |
| 2015/0070523 | A1* | 3/2015 | Chao | H04N 5/262 |
| | | | | 348/218.1 |
| 2015/0098000 | A1* | 4/2015 | Gosangi | G06T 11/60 |
| | | | | 348/333.02 |
| 2018/0143986 | A1* | 5/2018 | Sinha | G06Q 30/0242 |

OTHER PUBLICATIONS

Anonymous, "Dual Shot," https://allaboutgalaxys4.com/galaxy-s4-features-explained/dual-shot/ (downloaded May 11, 2023) (23 pages).
Mai et al., "Rule of thirds detection from photograph," 2011 IEEE International Symposium on Multimedia, Dana Point, pp. 91-96 (2011).
Peters, "Google Clips is dead/RIP," The Verge, 2019 (5 pages).
SelfieX—Automatic Back Camera Selfie, Vito Technology, Inc., https://apps.apple.com/us/app/selfiex-automatic-back-camera-selfie/id970425302 (undated) (3 pages).
Shah, "The Pixel 3 can automatically take your 'best' selfie," engadget, (2019) (3 pages).
Silberling, "Instagram's Dual camera feature copies BeReal, but misses the point," TechCrunch (https://techcrunch.com/2022/07/28/instagram-dual-camera-feature-copies-bereal-misses-point/) (2022) (12 pages).
Team Snap, "Introducing Dual Camera on Snapchat!," Snap Creators (https://creators.snap.com/blog-dual-camera?lang=en-US) (2022) (3 pages).
Wiggers, "ImagenAI, which uses AI to personalize photo editing styles, lands $30M," TechCrunch, Dec. 19, 2022 (https://techcrunch.com/2022/12/19/imagenai-which-uses-ai-to-personalize-photo-editing-styles-lands-30m/) (9 pages).
Wikipedia "Rule of thirds," (downloaded May 11, 2023) (5 pages).
Wood, "How to Beautify My Portrait with Golden Ratio Face Analyzer—Here is Best Tips You Should Know," WidsMob (https://www.widsmob.com/articles/face-analyzer.html) (2022) (9 pages).

* cited by examiner

SYSTEMS AND METHODS FOR AUTOMATED IMAGE CAPTURE ASSISTANCE AND DUAL CAMERA MODE

FIELD OF THE DISCLOSURE

One or more disclosed embodiments are directed towards systems and methods for enabling improved image capture and editing by a computing device, which may comprise a plurality of cameras facing in different directions.

SUMMARY

With the proliferation of smartphones comprising front-facing and rear-facing cameras, image creation, image editing and image sharing on smartphones has become increasingly convenient and popular. Smartphone camera sensors and computational imaging capabilities on smartphones have both been continuously advancing, with camera sensors being able to capture increasingly detailed images, and captured images able to be processed and edited with effects, touchups and alterations that require ever-increasing computing power. The utilization of streams from both the front-facing and the rear-facing cameras enable a smartphone to simultaneously output images from the front-facing and rear-facing cameras. Image applications may offer a user interface option to combine the images from both of the cameras in various manners, for example, stitching the output from both cameras together in a single image. In one approach, image editing applications may utilize an artificial intelligence algorithm to non-destructively combine images from different cameras; however, such an approach tends to lead to an increase in manual user interface manipulations in order to choose the parts of output images to combine, and/or to apply an identified combination to the output of a plurality of cameras in order to produce a combined image. In addition, in order to retain the non-destructive nature of the combination, there may be a relative increase in the amount of storage required to save both original and combined images, not least because there is no inherent indication of which combined images are likely to be retained and which combined images will ultimately be discarded. In order to reduce the number of manual user interface manipulations and storage requirements with combining images from a plurality of cameras, there is a need to combine images and to objectively determine whether a combined image should be retained.

To help address these problems, systems and methods are provided herein that enable improved image capture at a computing device comprising a plurality of cameras.

Systems and methods are described herein that enable improved image capture at a computing device comprising a plurality of cameras. In accordance with some aspects of the disclosure, a method is provided. The method includes receiving first and second capture streams from respective first and second cameras of a computing device, wherein the first camera and the second camera face in different directions. A region of the first capture stream to include as an overlay over a portion of the second capture stream is identified. A combined frame comprising a frame from the second capture stream with an overlay from the region of the first capture stream is generated, and a plurality of image components in the combined frame are identified via image component analysis. The identified components are compared to at least one predetermined image rule, and it is determined, based on the comparing, that the combined frame meets a threshold criterion. In some examples, the non-transitory memory may be the memory of one or more of a computing device or a cloud server.

In an example system, a smartphone user enables a mode for taking simultaneous captures from a front and a rear camera of the smartphone. A region of the capture stream from the front camera, for example, a face of the user, is identified as an overlay for overlaying on a second stream from the rear camera. The overlay and a frame from the second stream are combined in a single frame, and a plurality of image components are identified via image component analysis. The identified image components are compared to at least one predetermined image rule, such as the rule-of-thirds, or the golden spiral. In some examples, image components may be identified based on the image rule itself. For example, image components that enable a comparison to the rule-of-thirds or the golden spiral may be identified. It is determined whether the combined frame meets a threshold criterion based on the comparing of the identified image components to the predetermined image rule, or rules. If the image does meet the threshold, then an image is generated based on the combined frame, and the image is stored in a memory of the smartphone. Generating a combined frame, and determining whether the combined frame meets threshold criterion based on image component analysis and reduces the number of manual user interface manipulations to generate a combined image, because the image may be produced without user input. In some embodiments, a user may simply point a camera device at a scene, and the output of the device's cameras may be automatically combined and retained, if the combined frame meets the threshold criteria.

A combined stream may be generated, with the combined stream comprising the region of the first capture stream overlaid, at a first location, over the portion of the second capture stream. Determining that the combined frame meets the threshold criterion may further comprise determining that the combined frame meets a criterion based on at least one of a golden spiral criterion or a rule-of-thirds criterion. The combined frame and an indicator associated with storing the image may be generated for output. Identifying the region of the first capture stream may further comprise identifying a person in the first stream and generating the person as the overlay via chroma key compositing.

A user interface element for moving the identified region of the first capture stream in the combined frame may be generated for output. User input associated with the user interface element may be received, and the identified region of the first capture stream may be moved, based on the received input, from a first location to a second location in the combined frame. A suggested location for relocating the identified region of the first capture stream in the combined frame may be identified, and an indicator associated with the suggested location may be generated for output.

A user interface element for resizing the identified region of the first capture stream in the combined frame may be generated for output. User input associated with the user interface element may be received at the computing device, and the identified region of the first capture stream may be resized from a first size to a second size in the combined frame at the computing device. Identifying a region of the first capture stream may further comprise identifying a plurality of sub-regions, each sub-region associated with a face of a person. Input associated with selecting one or more of the sub-regions may be received at the computing device, and the overlay may comprise the faces associated with the selected sub-regions.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 6:
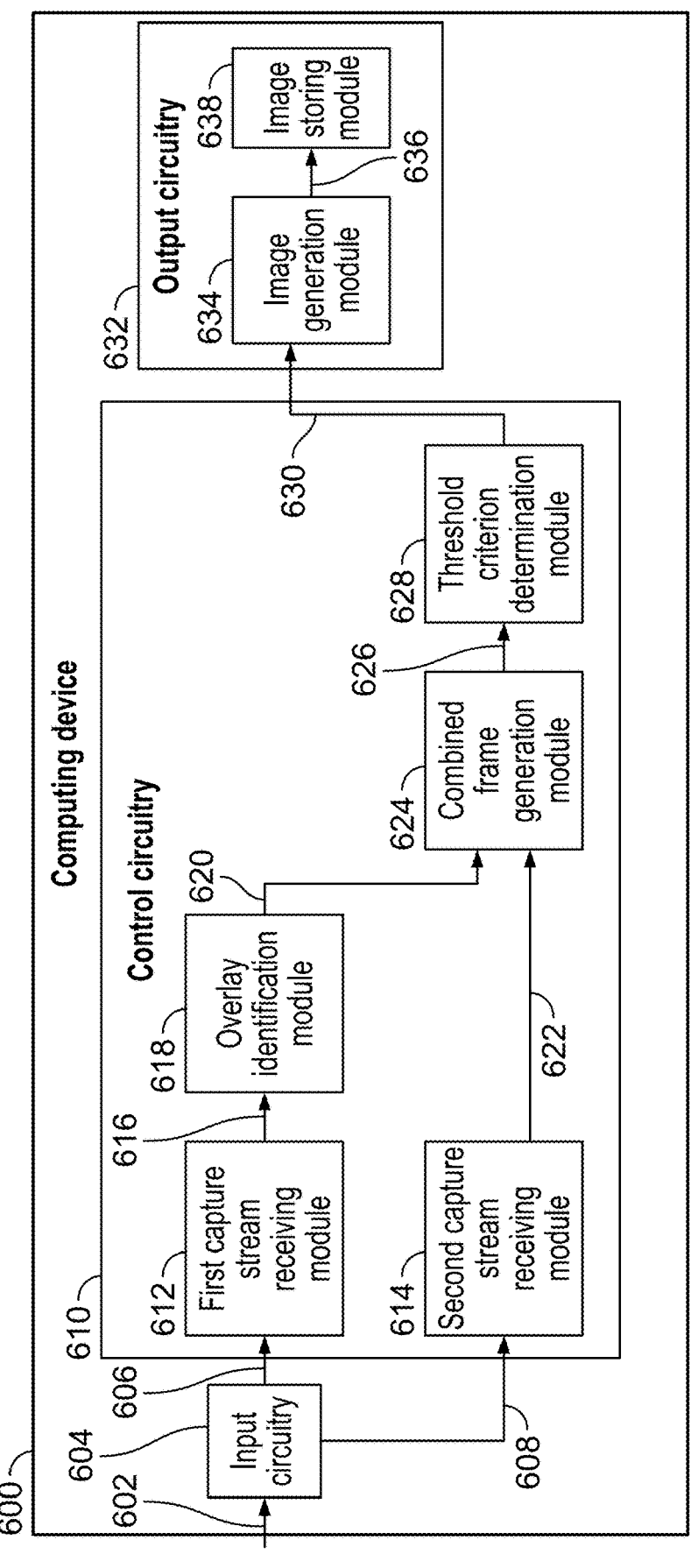
Figure 7:
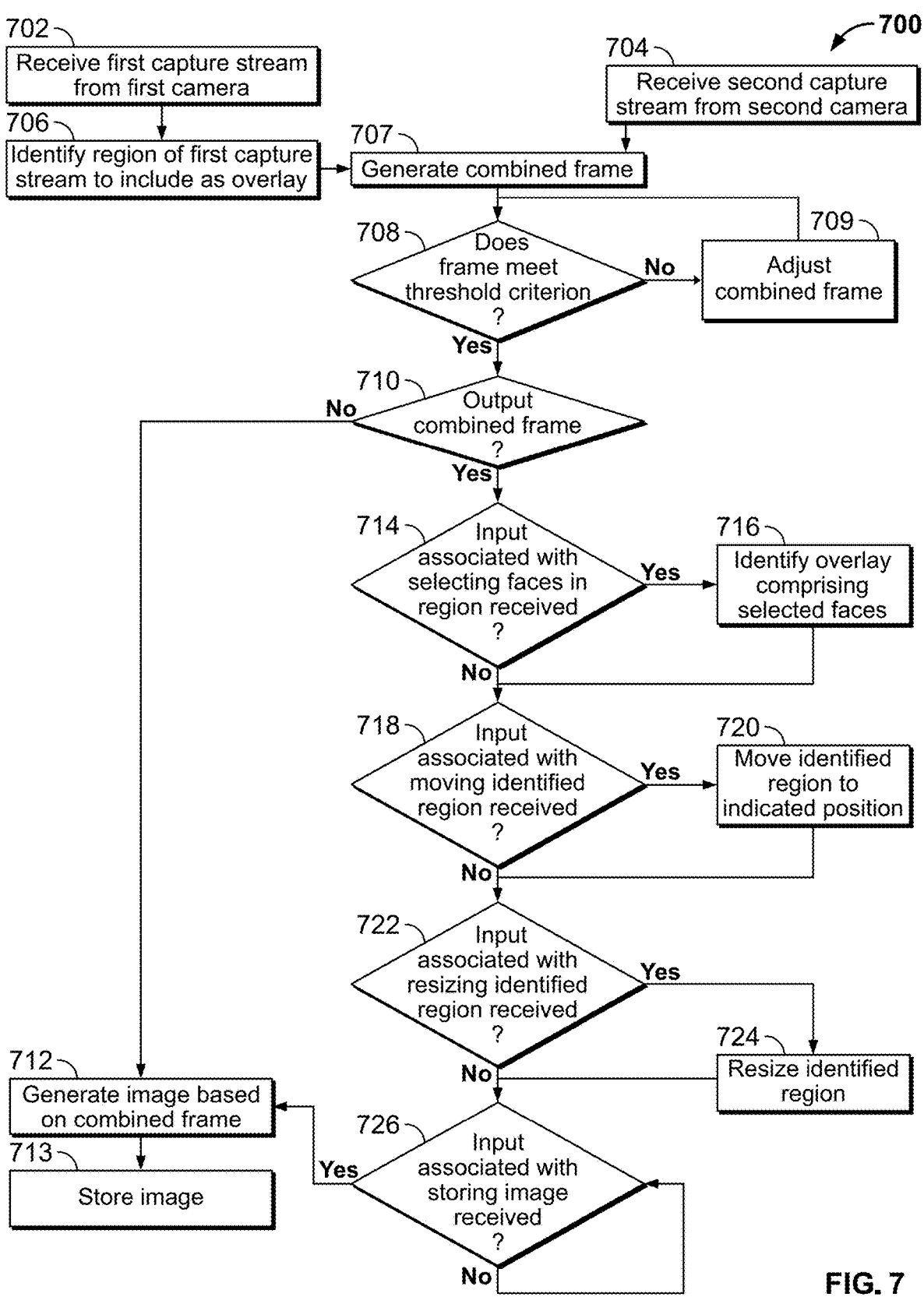

FIG. 6 shows a block diagram representing components of a computing device and dataflow therebetween for enabling improved image capture at a computing device comprising a plurality of cameras, in accordance with some embodiments of the disclosure; and FIG. 7 shows a flowchart of illustrative steps involved in enabling improved image capture at a computing device comprising a plurality of cameras, in accordance with some embodiments of the disclosure.

DETAILED DESCRIPTION

The disclosed methods and systems may be implemented on one or more computing devices. As referred to herein, the computing device can be any device comprising a processor, memory and is capable of receiving input from an integrated and/or external camera, for example, a personal computer (PC), a laptop computer, a tablet computer, a handheld computer, a personal digital assistant (PDA), a mobile telephone, a portable video player, a portable music player, a portable gaming machine, a smartphone, a smartwatch, a smart speaker, a head-mounted display, an augmented reality headset, a mixed reality device, a virtual reality device, a gaming console, an automobile, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
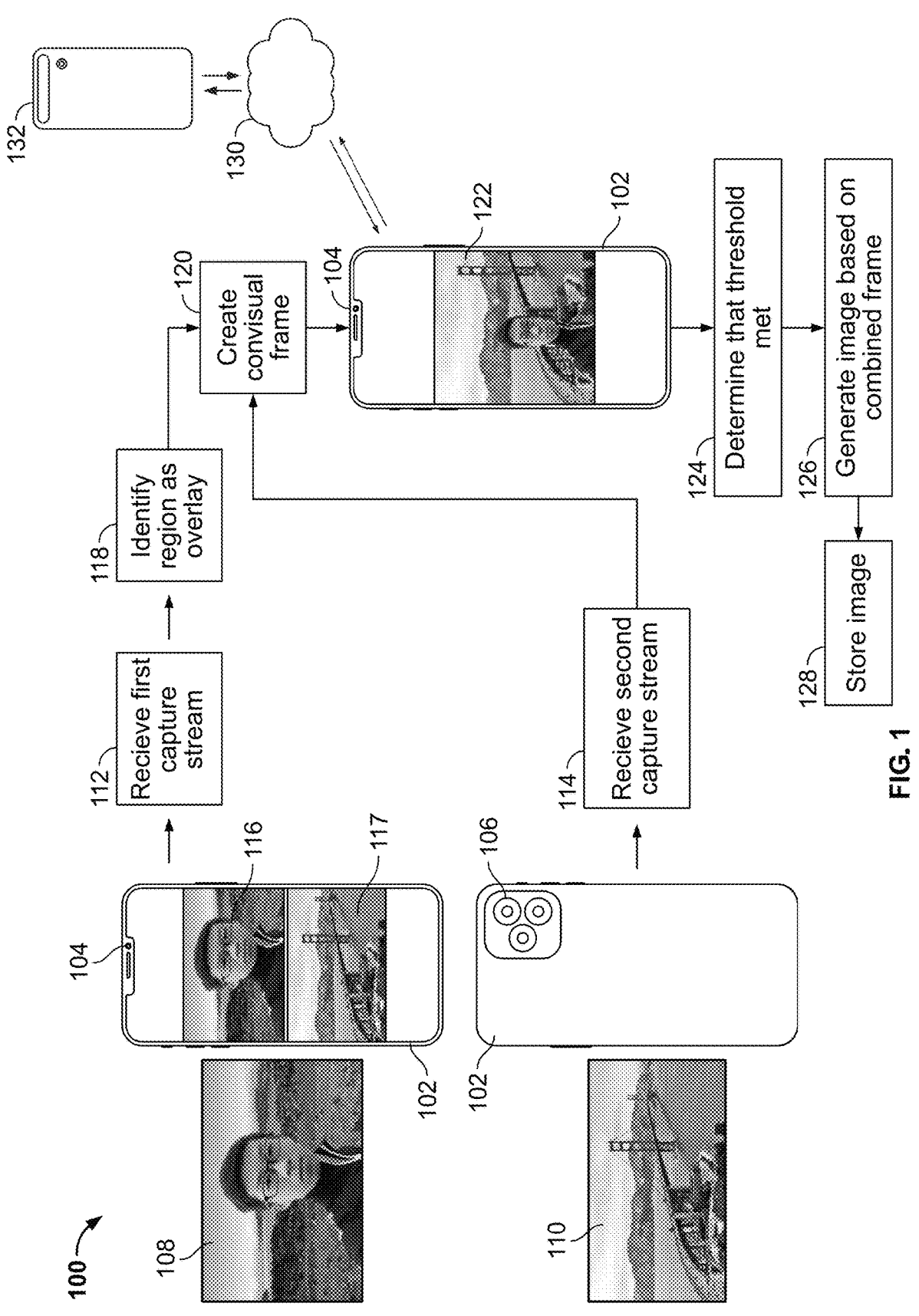
FIG. 1 shows an example environment for enabling improved image capture at a computing device comprising a plurality of cameras, in accordance with some embodiments of the disclosure.

FIG. 1 shows an example environment for enabling improved image capture at a computing device comprising a plurality of cameras, in accordance with some embodiments of the disclosure. The environment 100 comprises a computing device 102 comprising a plurality of capture devices, at least two of the capture devices facing in different directions. In this example, the computing device is a smartphone, which comprises one or more cameras 104 and one or more cameras 106. In an embodiment, the camera 104 is a front-facing camera, and the camera 106 is a rear-facing camera. In this example, the cameras face in opposite directions, but in other examples, the cameras could be, for example, 90° from each other, with a first camera on the front face of the device, and a second camera on an edge of the device. The first camera 104 captures a first scene 108 comprising a person and background of the person, and the second camera 106 captures a second scene 110 comprising a landscape in front of the person. In this example, the first and second cameras 104, 106 capture the two scenes 108, 110 simultaneously and in real time, or substantially in real time.

The first capture stream is received 112 from the first camera 104, and the second capture stream is received 114 from the second camera 106. In some examples, one or both of the capture streams may be generated for output at a display of the device 102. Where a computing device receives capture streams from more than two cameras, a corresponding number or subset of capture streams may be generated for display at the computing device. In this example, the first capture stream 116 and the second capture stream 117 are simultaneously displayed at a screen of the device 102. A region of the first capture stream is identified to include as an overlay over a portion of the second capture stream. In this example, the person's face is identified 118 to be included as an overlay over a portion of the second capture stream. For example, a person may be identified in the first stream, and the person may be generated as the overlay via chroma key compositing. In some examples, the region may be configurable in response to user input, such that the region of the first stream that is included in the overlay is selectable by a user. In other examples, the overlay may be a fixed region of the first stream, for example, outline and/or cut-out region may be displayed at a display of the device 102, and the part of the stream that is present in the outline region may be identified to include as an overlay over a portion of the second capture stream. In other examples, different modes may be utilized to identify the region, such as a mode for identifying animals, plants and/or buildings. In some examples, the identified region to be included as an overlay may be taken from any of the streams captured by cameras of a computing device and may be overlaid onto any other of the streams captured by cameras of a computing device.

A combined frame is created 120 from the second stream and the identified region from the first stream. The overlay may be placed in a default position on the second stream. In another example, image processing and/or artificial intelligence (AI) may be utilized to identify an optimal or recommended position for placing the overlay on the second stream. The device 102 may comprise an AI accelerator processor, such as a Google Tensor, Snapdragon 8 and/or a Samsung Exynos processor. In some examples, the combined frame 122 may be generated for output at the device 102. In this example, the combined frame comprises the head and shoulders from the person in the first scene 108 overlaid onto the landscape in the second scene 110. In further examples, the combined frame 122 may be a static frame. In other examples, the combined frame 122 may comprise combined first and second streams, such that the combined frame is continuously updated.

It is determined 124 that the combined frame meets a threshold criterion based on image component analysis. The determination comprises identifying a plurality of image components via image component analysis. The identified image components are compared to at least one predetermined image rule, such as the rule-of-thirds, or the golden spiral. In some examples, image components may be identified based on the image rule itself. For example, image components that enable a comparison to the rule-of-thirds, or the golden spiral may be identified. It is determined whether the combined frame meets a threshold criterion based on the comparing of the identified image components to the predetermined image rule, or rules. These may be any suitable threshold criteria, and may be implemented via, for example, a trained machine learning algorithm. For example, the criteria may be based on focused on detecting and analyzing facial expressions, composition and/or lighting. In some examples, it may be determined that the combined frame meets a threshold based on at least one of a golden spiral criterion or a rule-of-thirds criterion. In a further example, a golden spiral-based criterion may be applied to an image that includes multiple subjects and/or objects, and a rule-of-thirds-based criterion may be applied to an image of a minimal scene comprising relatively little distraction in terms of depth and/or alignment. In another example, the threshold may be based on user preference and/or a user profile. A user interface element may enable a user to select a guideline or guidelines, conditions and/or an aggregated score, on which the threshold criteria may be based. A visual indication of whether a combined frame meets the threshold criteria may be generated for output. This may be, for example, in the form of a score. Generated scores may be stored with generated images, for example, as metadata, such that when a saved image is subsequently accessed, the score may be accessed as well. Saved images may be grouped by score, and scores of saved images may be recalculated in response to input associated with a user interface element for changing the one or more settings related to the threshold criteria. In some examples, the threshold criteria may be based on historic user actions.

In some examples, a combined frame may be edited, for example automatically, in order to improve a score of the combined frame such that it meets the threshold criterion. In an example, a combined frame that does not meet the rule-of-thirds based criterion may be cropped in a manner that makes it meet the rule-of-thirds-based criterion. In another example, one or more user interface elements may be utilized to independently optimize the exposure settings for the overlay and the stream from the second camera. For example, a device may generate the output of two cameras (or more) for display, and a user may select areas in the displayed output for a target exposure. In this example of a device with two cameras, the exposure settings for the front-facing camera may be optimized to better capture the face, and those for the rear-facing camera may be optimized to better capture the highlights. In this manner, a blended image may be created that creates desired detail of both shadow and highlights (i.e., areas of an image that have increased brightness and/or increased lighting applied to, for example, a face, or any other chosen object, or part of an object, in an image). The detail of shadow and/or highlights may be achieved via chancing exposure settings and/or high dynamic range settings) In some examples, the blended image may be visible in a live preview on the phone, rather than by editing two captures at a later stage. This may enable both shadow and highlight details to be captured and preserved in the generated image.

In response to determining that the threshold is met 126 an image is generated based on the combined frame and the image is stored 128. In some examples, the image is stored in a non-transitory memory of the device 102. In other examples, the non-transitory memory is the memory of a computing device other than the device 102 and/or a cloud server. In some examples, a user interface element may enable a user to share a generated image directly to an application and/or a social network.

In some examples, the first and/or second capture streams may be received at a server 132. The stream, or streams, may be transmitted from the device via a network 130, such as the internet, to the server 132. In an example, the server 132 may identify the region of the first capture stream to include as an overlay over a portion of the second capture stream. In some examples, the server 132 may transmit an indication of the region to the device 102, where the combined frame may be created. In other examples, the combined frame may be created at the server 132, and may be transmitted via the network 130 to the device 102. In a further example, determining that the threshold is met may also be performed at the server 132, and only images based on combined frames 122 that meet the threshold may be transmitted to the device 102 for storage. In another example, images generated based on combined frames that meet the threshold may be stored at the server 132 so that the device 102 simply captures the first and second streams, and images based on combined frames that meet the threshold are stored at the server 132 without user intervention. In some examples, the images may be stored at the same or a different physical and/or virtual server as the server that performs the discussed processing steps.

In some examples, the utilization of a threshold may enable combined images to be automatically generated and stored, without user intervention, if it is identified that a combined frame meets the threshold criteria.

Figure 2:
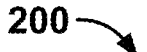
FIG. 2 shows an example application of the golden spiral, in accordance with some embodiments of the disclosure.
Figure 2:
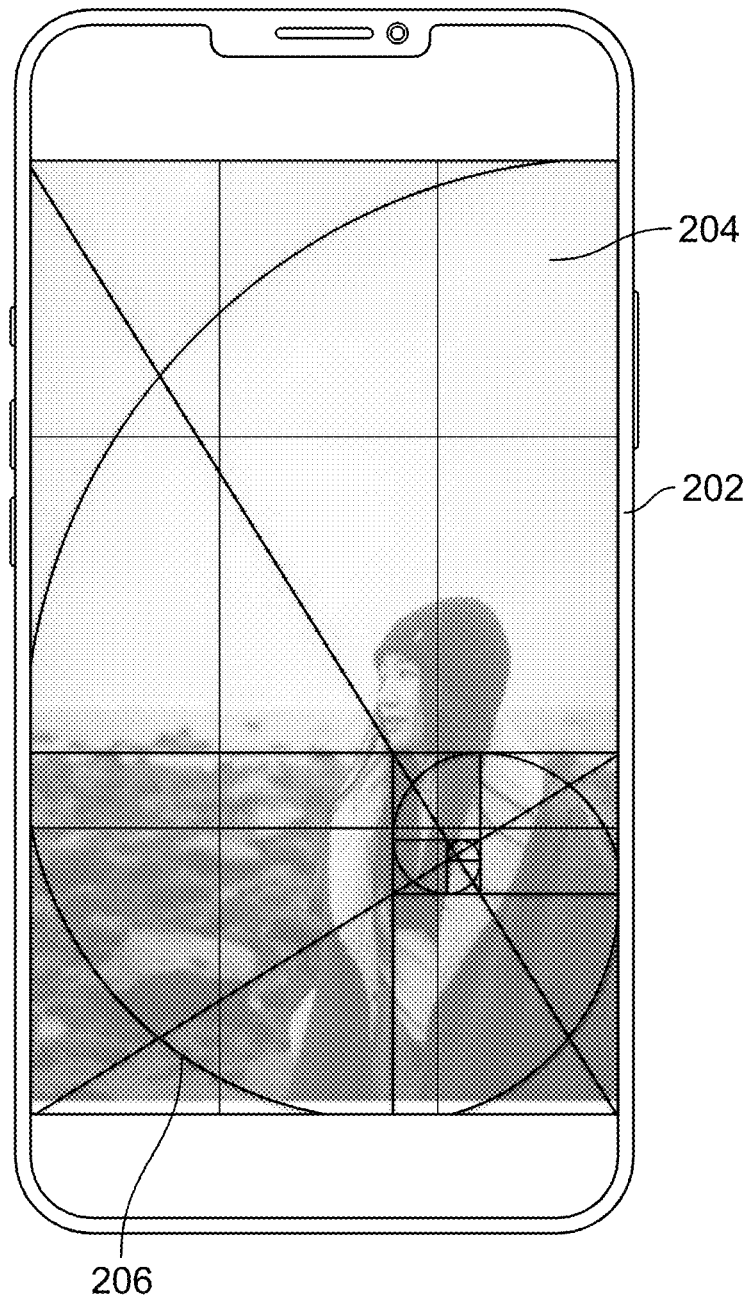

FIG. 2 shows an example application of the golden spiral, in accordance with some embodiments of the disclosure. The environment 200 comprises a computing device 202, such as a smartphone. A golden rectangle is a rectangle whose side lengths are in the golden ratio, $$1: \frac{1 + \sqrt{5}}{2},$$

which is 1:φ. Successive points dividing a golden rectangle into squares lie on a logarithmic spiral whose growth factor is φ, the golden spiral. The device display may display an image 204 with the golden spiral 206 overlaid. In some examples, an image that conforms to the golden spiral may add or emphasize a dynamic feeling in the photo that includes multiple subjects or objects.

Figure 3:
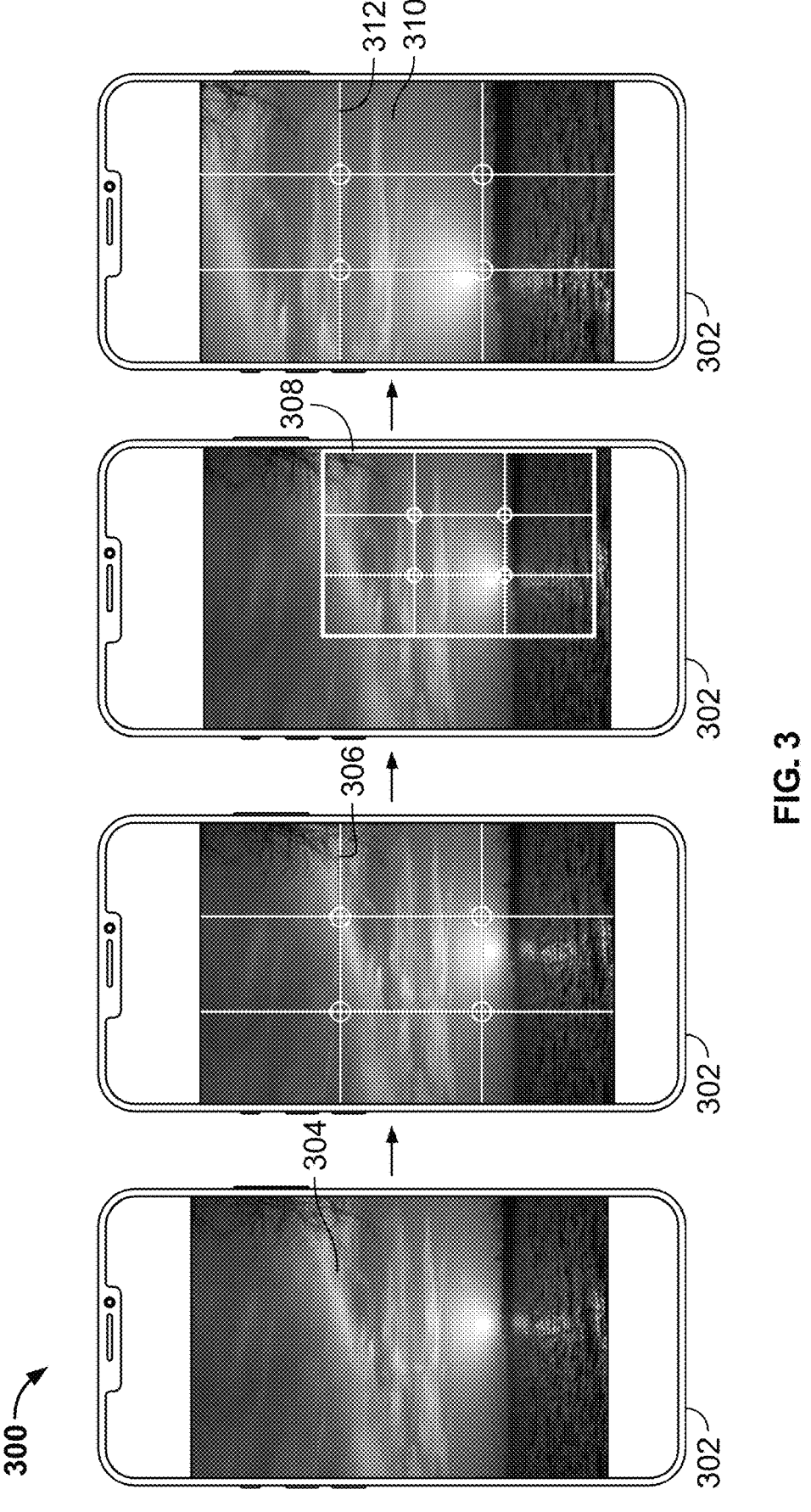
FIG. 3 shows an example application of the rule-of-thirds, in accordance with some embodiments of the disclosure.

FIG. 3 shows an example application of the rule-of-thirds, in accordance with some embodiments of the disclosure. The rule-of-thirds proposes that an image should be imagined as divided into nine equal parts by two equally spaced horizontal lines and two equally spaced vertical lines (as indicated by, for example, the first and second grids 306, 312, discussed below), and that important compositional elements should be placed along these lines or their intersections. The environment 300 comprises a computing device 302, such as a smartphone. An image 304 is displayed on or at the device 302. A first grid 306 is overlaid on the image, and it is determined that the image does not conform to the rule-of-thirds. For example, by an image-processing algorithm. The first grid 306 comprises two equally spaced horizontal lines and two equally spaced vertical lines that divide the image into nine equal parts. Selecting an area 308 of the image to crop can generate an image 310 that does conform to the rule-of-thirds, as indicated by second grid 312. The second grid 312 also comprises two equally spaced horizontal lines and two equally spaced vertical lines that divide the image into nine equal parts. In some examples, the selected area may be generated by an image-processing algorithm.

Figure 4:
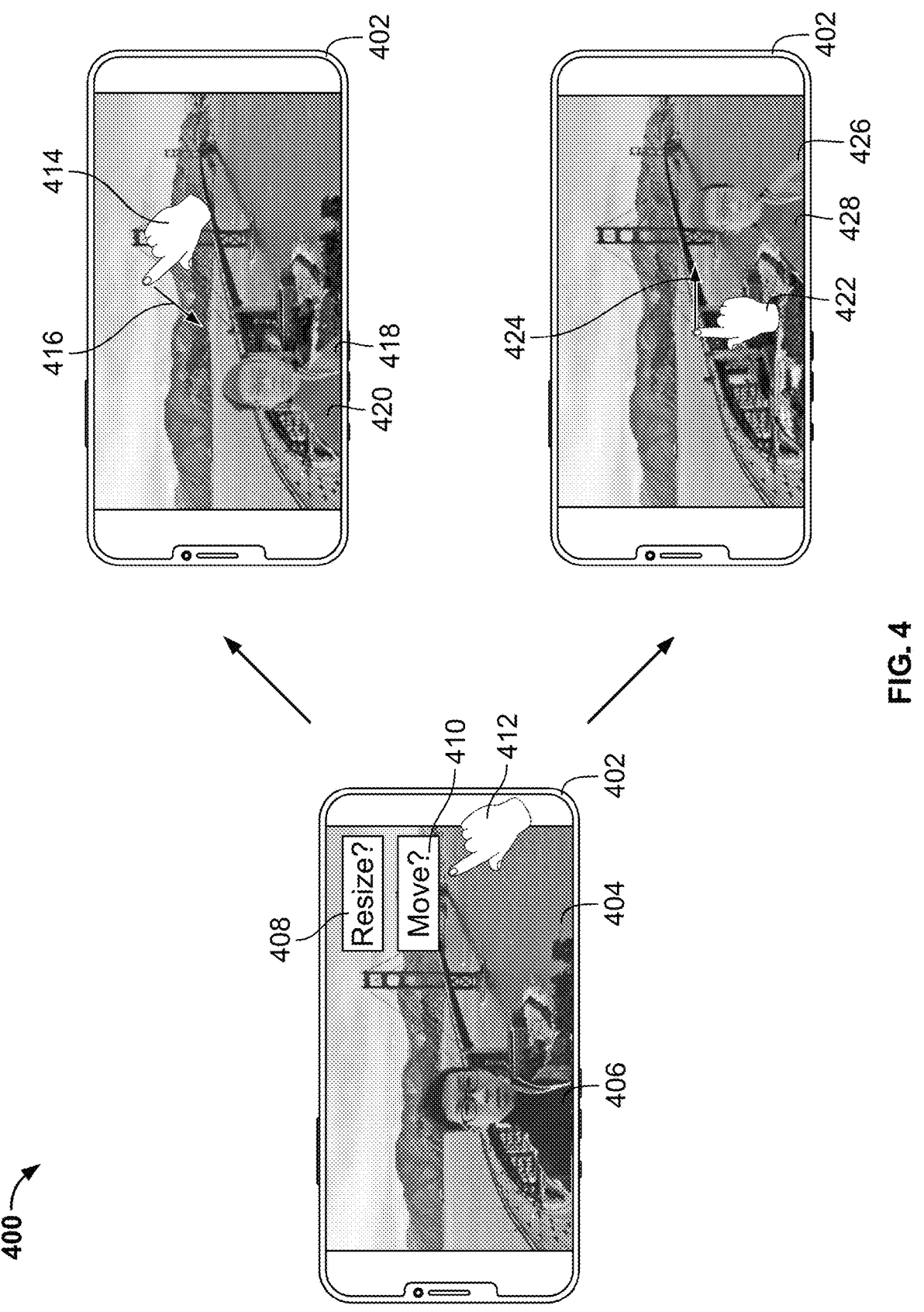
FIG. 4 shows another example environment for enabling improved image capture at a computing device comprising a plurality of cameras, in accordance with some embodiments of the disclosure.

FIG. 4 shows another example environment for enabling improved image capture at a computing device comprising a plurality of cameras, in accordance with some embodiments of the disclosure. The environment 400 comprises a computing device 402, such as a smartphone. The device 402 generates a combined frame such as the frame 122 of FIG. 1, for output. The combined frame comprises a frame 404 from a first capture stream and an overlay 406 from a region of a second capture stream. User interface elements 408, 410 are generated for output at, and/or at a display of, the device 402. A first user interface element 408 enables a user to resize the overlay 406 in the combined frame, and a second user interface element 410 enables the user to move the overlay 406 in the combined frame.

On receiving user input 412 associated with the first user interface element 408, the user may resize the overlay 406. For example, the user may touch 414 a touchscreen of the device 402 and may swipe a finger in a first direction 416 to make the overlay smaller. In some examples the user may swipe their finger in a second direction (not shown) to make the overlay larger. In a further example, an indicated region 418 may be generated for display, that indicates a recommended size for resizing the overlay. On receiving user input 414 associated with resizing the overlay 406, the combined frame comprises a resized overlay 420. In some examples, a user may interact directly with the combined frame, and without interacting with the first user interface element 408, in order to resize the overlay 406. On resizing the overlay, the process may proceed as discussed in FIG. 1, and it may be determined whether the combined image meets the threshold criteria. In some examples, the indicated region 418 may be generated in order to cause the combined frame to meet the threshold criteria. In other examples, the resizing may be applied to the frame of the first capture stream.

On receiving user input 412 associated with the second user interface element 410, the user may move the overlay 406. For example, the user may touch 422 a touchscreen of the device 402 and may swipe a finger in a first direction 424 to move the overlay in the first direction. In some examples the user may swipe their finger in a second direction (not shown) to move the overlay in a second direction. In a further example, an indicated region 426 may be generated for display that indicates a recommended position for the overlay. On receiving user input 422 associated with moving the overlay 406, the combined frame comprises a moved overlay 428. In some examples, a user may interact directly with the combined frame without interacting with the second user interface element 410, in order to move the overlay 406. On moving the overlay, the process may proceed as discussed in FIG. 1, and it may be determined whether the combined image meets the threshold criteria. In some examples, the indicated region 426 may be generated in order to cause the combined frame to meet the threshold criteria.

In a further example, the overlay may be mirrored, or auto-mirrored, to help ensure consistency of lighting in the captures of dual cameras. For example, if sunlight shines on the face of a user, mirroring the overlay from a first camera stream may cause a perception that the sunlight is in the same direction seen in the capture from a second camera.

The resizing and moving discussed above may be applied to videos as well as to still images. Once the intended size and/or position of a user is determined, for example, the front camera of the device may capture a video of the user talking. The rear camera may capture a video that the user wants to share. The video of the user talking may appear in a fixed size and position in the rear camera video. Optionally, the front camera video may gradually move in the final video if the user configures the intended sizes and positions. For instance, the video of the user may move from a start position to a finish position during the recording or video.

Figure 5:
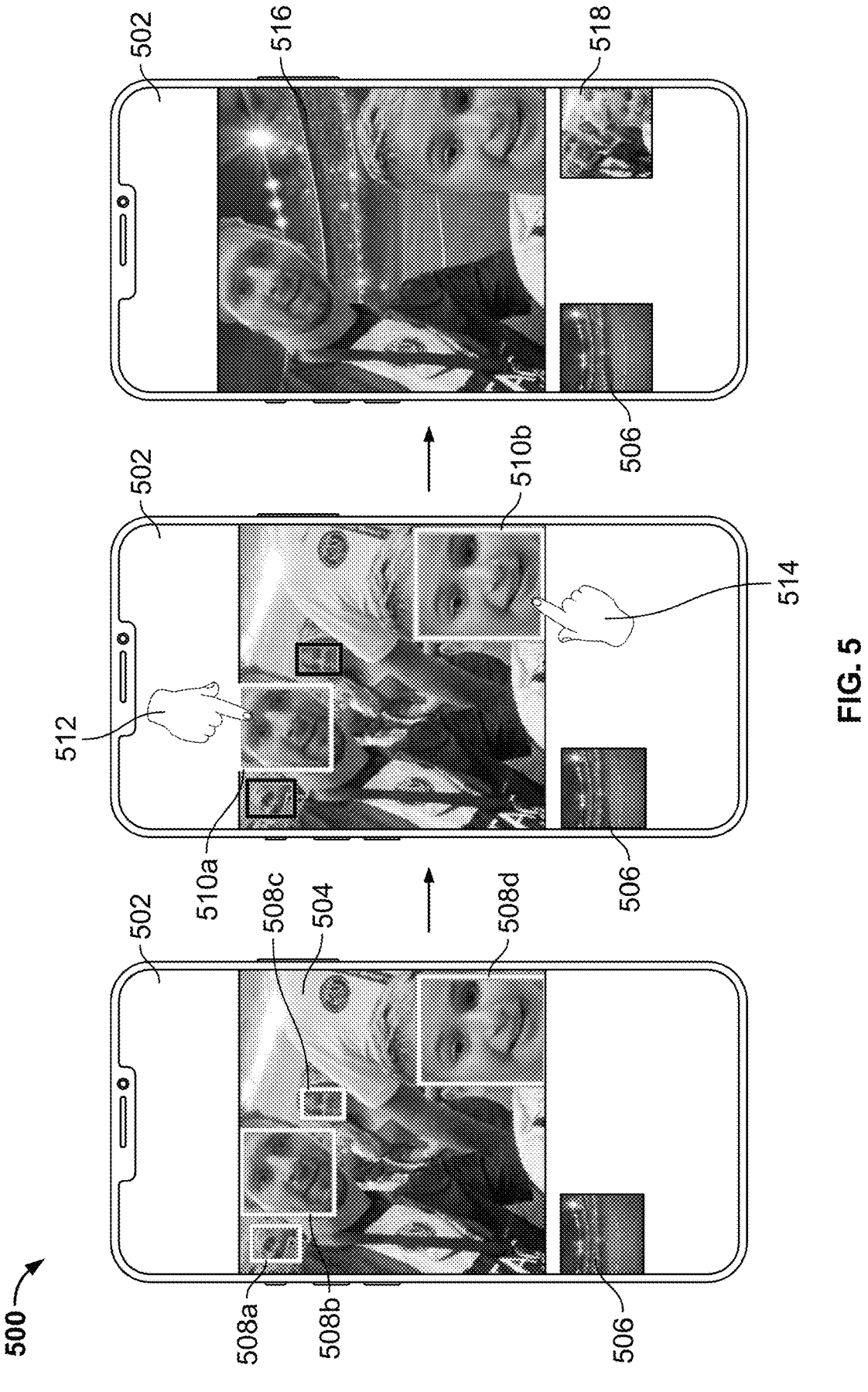
FIG. 5 shows another example environment for enabling improved image capture at a computing device comprising a plurality of cameras, in accordance with some embodiments of the disclosure.

FIG. 5 shows another example environment for enabling improved image capture at a computing device comprising a plurality of cameras, in accordance with some embodiments of the disclosure. The environment 500 comprises a computing device 502, such as a smartphone. The device generates first and second capture streams 504, 506 for output, from respective first and second cameras. In this example, both capture streams 504, 506 are generated for output, with the second capture stream being generated for output in a smaller window; however, in some examples, only the first capture stream 504 may be generated for output. The first capture stream 504 comprises a plurality of faces that are indicated by a plurality of quadrilaterals 508a, 508b, 508c, 508d. In some examples, an image-processing algorithm may be utilized to identify the faces and apply the quadrilaterals. A subset 510a, 510b of the quadrilaterals are selected, for example, by touch events 512, 514 associated with the quadrilaterals. On receiving a selection of a subset of the quadrilaterals, a combined frame 516, such as the frame 122 of FIG. 1, is generated for output. The combined frame comprises the scene from the second stream 506, and the people associated with the selected faces. In some examples, the scene from the second stream may be blurred in response to user input associated with a user interface element. In other examples, the first stream may also be generated for output in a smaller window 518. On generating and displaying the combined frame 516, the process may proceed as discussed in FIG. 1, and it may be determined whether the combined image meets the threshold criteria. In a further example, if it is determined that the image comprises a crowded place, faces in the background of the image may be ignored and/or excluded from the threshold criteria determination.

FIG. 6 shows a block diagram representing components of a computing device and dataflow therebetween for enabling improved image capture at a computing device comprising a plurality of cameras, in accordance with some embodiments of the disclosure. Computing device 600 (e.g., computing devices 102, 202, 302, 402, 502) comprises input circuitry 604, control circuitry 610 and output circuitry 632. Control circuitry 610 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 602 by the input circuitry 604. The input circuitry 604 is configured to receive inputs related to a computing device. For example, this may be via a touchscreen, a Bluetooth and/or Wi-Fi controller of the computing device 600, an infrared controller, a keyboard, a mouse and/or a microphone. In other examples, this may be via gesture detected via an extended reality device. In another example, the input may comprise instructions received via another computing device. The input circuitry 604 transmits 606, 608 the user input to the control circuitry 610.

The control circuitry 610 comprises a first capture stream receiving module 612, a second capture stream receiving module 614, an overlay identification module 618, a combined frame generation module 624 and a threshold criteria determination module 628. The output circuitry 632 comprises an image generation module 634 and an image storing module 638. The input is transmitted 606, 608 to the first capture stream receiving module 612 and the second capture stream receiving module 614, where respective first and second capture streams are received from first and second capture devices, such as cameras, of the computing device 600. The first capture stream is transmitted 616 to the overlay identification module 618, where a region of the first capture stream to include as an overlay over a portion of the second capture stream is identified. The overlay is transmitted 620 from the overlay identification module 618 to the combined frame generation module 624. The second capture stream is also transmitted 622 from the second capture stream receiving module 614 to the combined frame generation module 624. At the combined frame generation module 624, the overlay and the second capture stream are combined to create a combined frame. The combined frame is transmitted 626 to the threshold criteria determination module 628, where it is determined whether the combined frame meets a threshold criterion based on image component analysis. If the combined frame meets the threshold, the combined frame is transmitted 630 to the output circuitry 632. The image generation module 634 receives the combined frame and generates an image based on the combined frame. The image is transmitted 636 to the image storing module 638, where the image is stored, for example, in a non-volatile memory of the computing device 600.

FIG. 7 shows a flowchart of an example process 700 including illustrative steps involved in enabling improved image capture at a computing device comprising a plurality of cameras, in accordance with some embodiments of the disclosure. Process 700 may be implemented, in whole or in part, on any of the aforementioned computing devices (e.g., computing devices 102, 202, 302, 402, 502, e.g., by way of executing one or more instructions or routines stored to memory or storage of a device). In addition, one or more actions of the process 700 may be incorporated into or combined with one or more actions of any other process or embodiments described herein.

At 702, a first capture stream is received from a first camera of a computing device, and at 704, a second capture stream is received from a second camera of the computing device. At 706, a region of the first capture stream to include as an overlay in a combined frame is identified. At 707, a combined frame is generated based on the overlay from the first capture stream and the second capture stream. At 708, it is determined whether the frame meets a threshold criterion based on image component analysis. If the frame does not meet the threshold criteria, then at 709, the combined frame is adjusted and the process proceeds back to 708, where it is identified whether the adjusted combined frame meets the threshold criterion. In some examples, adjusting the combined frame at 709 may comprise receiving input via a user interface for adjusting the combined frame. In other examples, adjusting the combined frame at 709 may comprise automatically adjusting the combined frame such that it meets the threshold criterion. In some example adjusting the combined frame may be an iterative process, with it being determined whether multiple adjusted combined frames meet the threshold criterion. In further examples, the adjusting may comprise one or more elements of input received via a user interface and automatic adjustments. In some examples (not shown), the process may loop back to step 707, with a new combined frame being generated from, for example, first and/or second capture streams. If, at 708, it is determined that the frame does meet the threshold criteria, then the process proceeds to step 710. At 710, it is determined whether the combined frame should be generated for output at the computing device. If it is determined that the combined frame should not be generated for output, then the process proceeds to step 712, where an image based on the combined frame is generated, and from step 712, the process proceeds to step 713, where the image is stored.

If, at 710, it is determined that a combined frame is to be generated for output, then the process proceeds to step 714, where it is determined whether input associated with selecting faces in the region to include as an overlay in the combined image has been received. If input associated with selecting faces has been received, the process proceeds to step 716, where an overlay comprising the selected faces is identified. The process then proceeds to step 718. If, at step 714, it is determined that input associated with selecting faces in the region to include as an overlay has not been received, the process then proceeds to step 718.

At step 718, it is determined whether input associated with moving the identified region in the first stream has been received. If input associated with moving the identified region has been received, the process proceeds to step 720, where the region is moved to an identified position. The process then proceeds to step 722. If, at step 718, it is determined that input associated with moving the identified region has not been received, the process then proceeds to step 722.

At step 722, it is determined whether input associated with resizing the identified region in the first stream has been received. If input associated with resizing the identified region has been received, the process proceeds to step 724, where the region is resized in an identified manner. The process then proceeds to step 726. If, at step 722, it is determined that input associated with moving the identified region has not been received, the process then proceeds to step 726.

At step 726, it is determined whether input associated with storing the image has been received. If no input has been received, in this example, the process simply loops until input has been received. In some examples, input associated with discarding the combined frame may be received, in which case the process ends. If input is received at 726, the process proceeds to step 712 where an image based on the combined frame is generated, as before, and from step 712, the process proceeds to step 713, where the image is stored.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a first capture stream from a first camera of a computing device;
receiving a second capture stream from a second camera of the computing device, wherein the first camera and the second camera face in different directions;
identifying a region of the first capture stream to include as an overlay over a portion of the second capture stream;
mirroring the region of the first capture stream to obtain consistency of lighting between the region of the first capture stream and the second capture stream;
generating the overlay that includes the mirrored region of the first capture stream;
generating a combined frame comprising a frame from the second capture stream with the generated overlay from the region of the first capture stream;
identifying, via image component analysis, a plurality of image components in the combined frame;
comparing the identified components to at least one predetermined image rule;
determining, based on the comparing, that the combined frame meets a threshold criterion; and
in response to the determining, storing an image based on the combined frame in a non-transitory memory.

2. The method of claim 1, wherein the method further comprises generating a combined stream comprising the generated overlay from the region of the first capture stream, at a first location, over the portion of the second capture stream.

3. The method of claim 1, wherein the at least one predetermined image rule is a golden spiral rule or a rule-of-thirds rule.

4. The method of claim 1, wherein the method further comprises:
generating, for output, the combined frame; and
generating, for output, an indicator associated with storing the image.

5. The method of claim 1, wherein identifying the region of the first capture stream further comprises:
identifying a person in the first capture stream; and
generating, via chroma key compositing, the person as the overlay.

6. The method of claim 1, further comprising:
generating, for output, a user interface element for moving the generated overlay from the region of the first capture stream in the combined frame;
receiving user input associated with the user interface element; and
moving, based on the received input, the generated overlay from the region of the first capture stream from a first location to a second location in the combined frame.

7. The method of claim 6, further comprising:
identifying a suggested location for relocating the generated overlay from the region of the first capture stream in the combined frame; and
generating, for output, an indicator associated with the suggested location.

8. The method of claim 1, further comprising:
generating, for output, a user interface element for resizing the generated overlay from the region of the first capture stream in the combined frame;
receiving, at the computing device, user input associated with the user interface element; and
resizing, based on the received input, the generated overlay from the region of the first capture stream from a first size to a second size in the combined frame.

9. The method of claim 1, wherein:
identifying the region of the first capture stream further comprises identifying a plurality of sub-regions, each sub-region associated with a face of a person;
the method further comprises receiving, at the computing device, input associated with selecting one or more of the sub-regions; and
the overlay comprises the faces associated with the selected sub-regions.

10. The method of claim 1, wherein:
determining that the combined frame meets the threshold criterion further comprises performing the determining via a trained machine learning model; and
the non-transitory memory is a memory of one or more of a computing device and a cloud server.

11. The method of claim 1, wherein mirroring the region of the first capture stream comprises aligning a first direction of a source of light associated with the overlay with a second direction of a source of light associated with the second capture stream.

12. A system comprising:
input circuitry configured to:
receive a first capture stream from a first camera of a computing device; and
receive a second capture stream from a second camera of the computing device, wherein the first camera and the second camera face in different directions; and
control circuitry configured to:
identify a region of the first capture stream to include as an overlay over a portion of the second capture stream;
mirror the region of the first capture stream to obtain consistency of lighting between the region of the first capture stream and the second capture stream;
generate the overlay that includes the mirrored region of the first capture stream;
generate a combined frame comprising a frame from the second capture stream with the generated overlay from the region of the first capture stream;

identify, via image component analysis, a plurality of image components in the combined frame;

compare the identified components to at least one predetermined image rule;

determine, based on the comparing, that the combined frame meets a threshold criterion; and in response to the determining, store an image based on the combined frame in a non-transitory memory.

13. The system of claim 12, wherein the control circuitry is configured to generate a combined stream comprising the generated overlay from the region of the first capture stream, at a first location, over the portion of the second capture stream.

14. The system of claim 12, wherein the at least one predetermined image rule is a golden spiral rule or a rule-of-thirds rule.

15. The system of claim 12, wherein the control circuitry is further configured to:

generate, for output, the combined frame; and generate, for output, an indicator associated with storing the image.

16. The system of claim 12, wherein the control circuitry configured to identify the region of the first capture stream is further configured to:

identify a person in the first capture stream; and generate, via chroma key compositing, the person as the overlay.

17. The system of claim 12, wherein the control circuitry is further configured to:

generate, for output, a user interface element for moving the generated overlay from the region of the first capture stream in the combined frame;

receive user input associated with the user interface element; and move, based on the received input, the generated overlay from the region of the first capture stream from a first location to a second location in the combined frame.

18. The system of claim 17, wherein the control circuitry is further configured to:

identify a suggested location for relocating the generated overlay from the region of the first capture stream in the combined frame; and generate, for output, an indicator associated with the suggested location.

19. The system of claim 12, wherein the control circuitry is further configured to:

generate, for output, a user interface element for resizing the generated overlay from the region of the first capture stream in the combined frame;

receive, at the computing device, user input associated with the user interface element; and resize, based on the received input, the generated overlay from the region of the first capture stream from a first size to a second size in the combined frame.

20. The system of claim 12, wherein:

the control circuitry configured to identify the region of the first capture stream is further configured to identify a plurality of sub-regions, each sub-region associated with a face of a person;

the control circuitry is further configured to receive, at the computing device, input associated with selecting one or more of the sub-regions; and the overlay comprises the faces associated with the selected sub-regions.

21. The system of claim 12, wherein:

the control circuitry configured to determine that the combined frame meets the threshold criterion is further configured to perform the determining via a trained machine learning model; and the non-transitory memory is a memory of one or more of a computing device or a cloud server.

22. The system of claim 12, wherein mirroring the region of the first capture stream comprises aligning a first direction of a source of light associated with the overlay with a second direction of a source of light associated with the second capture stream.

* * * * *